United States Patent

[11] 3,630,255

| [72] | Inventor | Carl P. Wonderley |
| | | Box 112, Grottoes, Va. 24441 |
| [21] | Appl. No. | 943 |
| [22] | Filed | Jan. 6, 1970 |
| [45] | Patented | Dec. 28, 1971 |

[54] TRACTION BELT ASSEMBLY
4 Claims, 5 Drawing Figs.

| [52] | U.S. Cl. | 152/215 |
| [51] | Int. Cl. | B60c 27/10 |
| [50] | Field of Search | 152/215 |

[56] References Cited
UNITED STATES PATENTS

| 2,474,640 | 6/1949 | Smith, Jr. | 152/214 |

FOREIGN PATENTS

| 563,170 | 9/1953 | Canada | 152/214 |

*Primary Examiner*—James B. Marbert
*Attorney*—Berman, Davidson and Berman

ABSTRACT: A traction belt assembly for motor vehicles useful for increasing the traction of the motor vehicle in mud, snow and icing conditions. The traction belt encompasses the tire and has a tension roller engaged therewith to maintain a constant tension on the belt. The roller is supported by spring-biased arms to permit it to float while tensioning the belt. The belt is provided with flanges along its opposite side edges to maintain its contact with the tire and is optionally provided with carbide studs for increased traction.

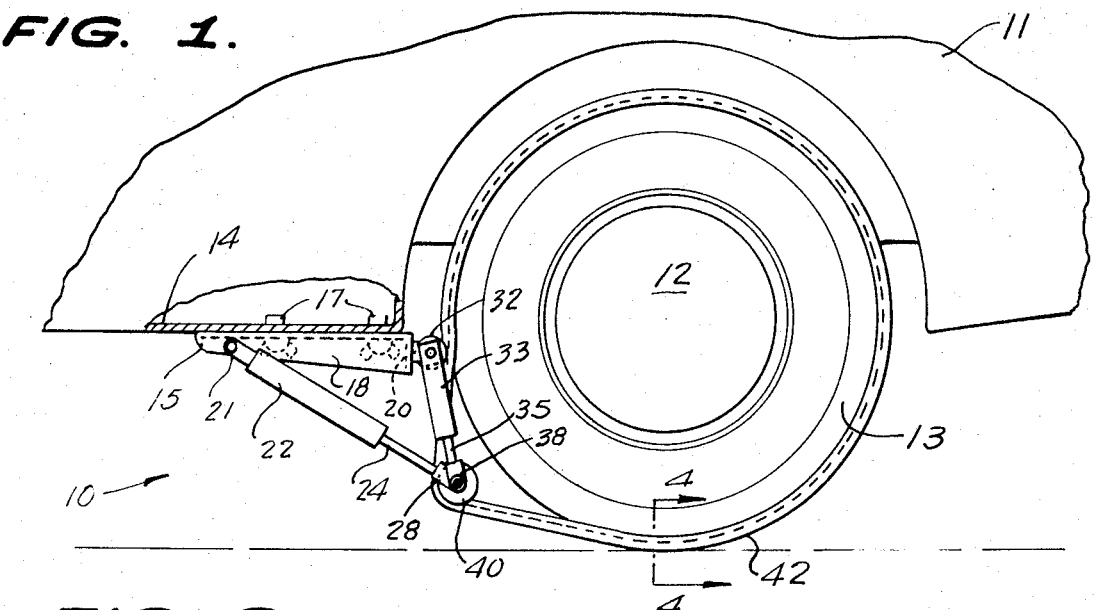
FIG. 1.
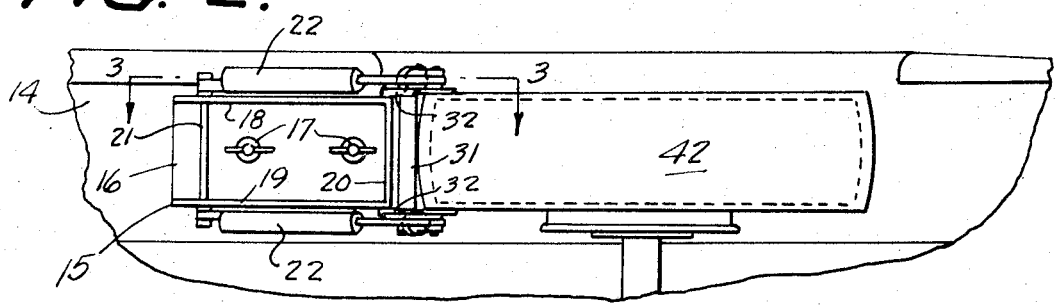
FIG. 2.
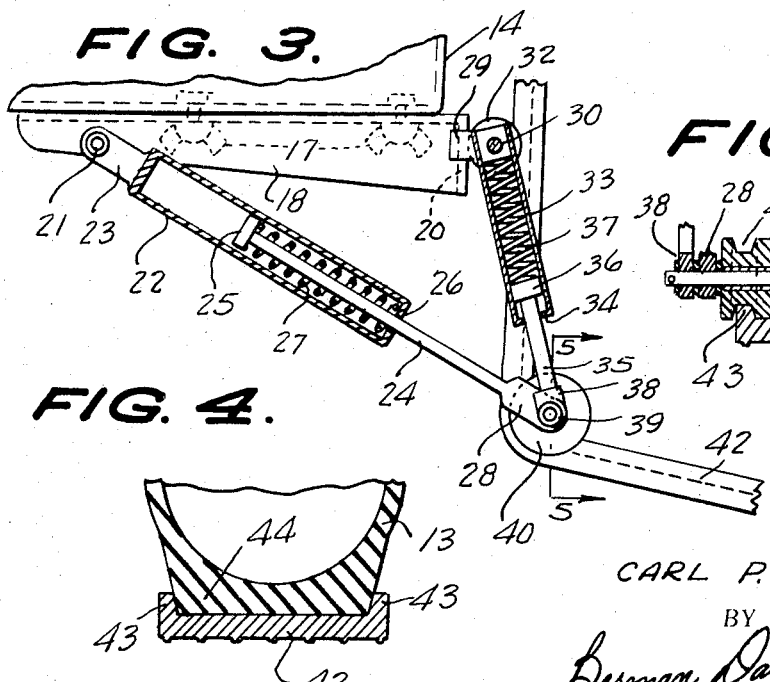
FIG. 3.
FIG. 5.
FIG. 4.
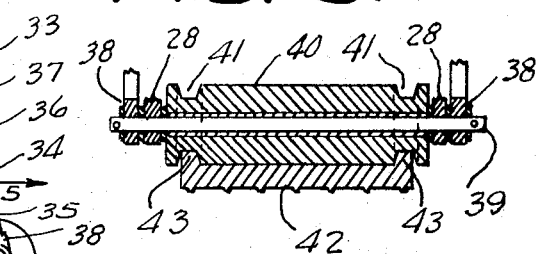
INVENTOR.
CARL P. WONDERLEY,
BY
Berman, Davidson & Berman,
ATTORNEYS.

TRACTION BELT ASSEMBLY

BACKGROUND OF THE INVENTION

Field of the Invention

The present invention relates to the general field of increasing the traction of the conventional tires on the drive wheels of a motor vehicle. The traction provided by the tires is sufficient for ordinary purposes but often found insufficient to cope with mud, snow and ice conditions.

Description of the Prior Art

Prior art traction-increasing equipment has consisted chiefly of antiskid chains applied directly to the automobile tire and to special tread designs of the automobile tire. Half-track belts have been utilized particularly in military vehicles but these have but these have been permanent installations not adapted to simple application and removal to increase traction only when needed.

SUMMARY OF THE INVENTION

The present invention includes a traction belt encompassing the tire of a motor vehicle and held thereon by a floating roller detachably connected to the chassis of the motor vehicle.

The primary object of the invention is to provide a traction-increasing device which can be readily and easily attached and detached from the motor vehicle so as to increase the traction when conditions require while avoiding its use and wear when conditions do not require.

Other objects and advantages will become apparent in the following specification when considered in the light of the attached drawings.

BRIEF DESCRIPTION OF THE DRAWING

FIG. 1 is a side elevation of the invention shown attached to a motor vehicle with the motor vehicle partially broken away for convenience of illustration;

FIG. 2 is a bottom plan view of the structure illustrated in FIG. 1;

FIG. 3 is an enlarged fragmentary sectional view taken along the line 3—3 of FIG. 2 looking in the direction of the arrows;

FIG. 4 is an enlarged fragmentary transverse section taken along the line 4—4 of FIG. 1 looking in the direction of the arrows; and FIG. 5 is a fragmentary transverse sectional view taken along the line 5—5 of FIG. 3 looking in the direction of the arrows.

DESCRIPTION OF THE PREFERRED EMBODIMENT

Referring now to the drawings in detail wherein like reference characters indicate like parts throughout the several figures, the reference numeral 10 indicates generally a traction belt assembly constructed in accordance with the invention.

The traction belt assembly 10 is detachably connected to a motor vehicle 11. The motor vehicle 11 is of conventional design having a drive wheel 12 on which is mounted a pneumatic tire 13. The motor vehicle 11 includes a chassis 14 of conventional design.

A bracket 15 includes a generally rectangular flat plate 16 which is detachably connected to the chassis 14 by thumb bolts 17. The plate 16 has a pair of depending side flanges 18, 19 and a depending end flange 20. The flanges 18, 19 and the flange 20 are all integrally formed with the flat plate 16 with the side flanges 18, 19 integrally connected to opposite ends of the end flange 20 as cam be seem in FIG. 2.

A shaft 21 extends through the side flanges 18, 19 adjacent the forward end thereof projecting outwardly on each side thereof. A pair of cylinders 22 are each provided with ears 23 mounted on the upper forward ends thereof with the ears 23 pivotally mounted on opposite ends of the shaft 21. A shaft 24 is slidably mounted in the cylinder 22 and has a head 25 integrally formed on its inner end within the cylinder 22. The cylinder 22 has an end closure 26 formed on its lower rear end through which the shaft 24 extends. A coil compression spring 27 is mounted in the cylinder 22 engaging the end closure 26 at one end and the head 25 at its other end so as to normally urge the shaft 24 inwardly of the cylinder 22. The outer end of the shaft 24 is provided with an ear 28 for reasons to be assigned.

A pair of ears 19 are secured in rearwardly projecting relation to the side flanges 18, 19 supporting a shaft 30 which extends transversely of the bracket 15 rearwardly of the end flange 20. A roller 31 is rotatably mounted on a shaft 30 and has circular flanges 32 formed on its opposite ends. The shaft 30 extends substantially beyond the ears 29 at each end thereof and has a pair of cylinders 33 pivotally mounted thereon. The cylinders 33 depend from the shaft 30 and have an end closure 34 through which a shaft 35 extends. The shaft 35 has a head 36 formed on its inner end within the cylinder 33 as can be seen in FIG. 3. A coil compression spring 37 is mounted in the cylinder 33 and engages at one end of the head 36 and the opposite end of the shaft 30 to normally urge the shaft 35 out of the cylinder 33.

An ear 38 is formed on the lower end of the shaft 35 overlying the ear 28 and a horizontal shaft 39 extends through the ears 28, 38 at each end thereof. A roller 40 is journaled on the shaft 39 and has a V-groove 41 formed adjacent each end thereof. A traction belt 42 is provided with inwardly projecting flanges 43 along each side edge thereof with the flanges 43 engaging in the grooves 41 of the roller 40 as can be seen in FIG. 5. The flanges 43 are spaced apart sufficiently to receive the tread 44 of the tire 13 therebetween as can be seen in FIG. 4.

The traction belt 42 engages the roller 31 between the flanges 32 to assist in maintaining the traction belt 42 in its drive position on the tire 13. The roller 40 serves as a tension roller and the traction belt 42 passes forwardly of and in engagement with the roller 40 as can be seen in FIG. 1. The cylinder, shaft 35 and spring 37 normally urge the roller 40 downwardly while the cylinder 22, shaft 24 and spring 27 normally urge the roller 40 forwardly and upwardly so that the roller 40 floats while maintaining tension on the traction belt 42.

The traction belt 42 can be of any desired material such as rubber and may have a roughened inner surface for driving engagement with the tire 13 while the outer surface may have a rough tread and/or be provided with carbide studs when conditions warrant.

Having thus described the preferred embodiments of the invention, it should be understood that numerous structural modifications and adaptations may be resorted to without departing from the spirit of the invention.

What is claimed is:

1. A traction belt assembly attachment for motor vehicles of the type including a chassis and a pneumatic-tired drive wheel supporting the chassis comprising a traction belt engaging about the pneumatic tire, a continuous flange formed on both edges of said belt and extending inwardly for engagement with the opposite side edges of said tire, a tension roller engaged within said belt with its axis parallel to the axis of said drive wheel, means mounting said roller on said chassis for swinging movement toward and away from the axis of said wheel with the axis of said roller remaining parallel to the axis of said wheel during the swinging movement, means forming part of said mounting means for spring urging said roller downwardly, and means forming part of said mounting means for spring urging said roller forwardly away from said wheel to maintain tension on said traction belt.

2. A device as claimed in claim 1 wherein said roller is provided with a V-groove adjacent each end thereof with said inwardly projecting flanges on said traction belt engaging therein.

3. A device as claimed in claim 1 wherein a second roller is fixedly mounted for rotation on the means for mounting said roller, with its axis parallel to said first roller, said second roller engaging the outer surface of said belt to assist in maintaining the engagement between said belt and said tire.

4. A device as claimed in claim 1 wherein each of said spring means includes a compression coil spring.

* * * * *